(12) United States Patent
Takagi

(10) Patent No.: US 10,085,268 B2
(45) Date of Patent: Sep. 25, 2018

(54) COMMUNICATIONS DEVICE AND COMMUNICATIONS SYSTEM

(71) Applicant: Panasonic Intellectual Property Management Co., Ltd., Osaka (JP)

(72) Inventor: Nobuya Takagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 30 days.

(21) Appl. No.: 15/067,608

(22) Filed: Mar. 11, 2016

(65) Prior Publication Data

US 2016/0198477 A1  Jul. 7, 2016

Related U.S. Application Data

(63) Continuation of application No. PCT/JP2014/004230, filed on Aug. 19, 2014.

(30) Foreign Application Priority Data

Sep. 11, 2013 (JP) ................................. 2013-187907

(51) Int. Cl.
*H04W 72/04* (2009.01)
*G06K 19/07* (2006.01)

(52) U.S. Cl.
CPC .... *H04W 72/0493* (2013.01); *G06K 19/0723* (2013.01); *H04W 72/0446* (2013.01)

(58) Field of Classification Search
None
See application file for complete search history.

(56) References Cited

U.S. PATENT DOCUMENTS

2005/0191968 A1  9/2005  Tabayashi et al.
2007/0180098 A1  8/2007  Matsuo
(Continued)

FOREIGN PATENT DOCUMENTS

JP   2002-183698 A   6/2002
JP   2004-192253 A   7/2004
(Continued)

OTHER PUBLICATIONS

International Search Report issued in Application No. PCT/JP2014/004230 dated Dec. 2, 2014, with English translation.
(Continued)

*Primary Examiner* — Diane Lo
(74) *Attorney, Agent, or Firm* — McDermott Will & Emery LLP

(57) ABSTRACT

Disclosed herein is a communications device including: a first transceiver configured to transmit and receive a signal compliant with a first communication protocol; a first protocol processor configured to process a first frame included in the received signal; a second transceiver configured to transmit and receive a signal compliant with a second communication protocol; a second protocol processor configured to process a second frame included in the received signal; a recognizer configured to recognize the communication protocol of the received signal; a command handler configured to handle a command extracted from the first frame; a converter configured to convert a command extracted from the second frame and pass the converted command to the command handler; and a memory configured to store device identification information for use in the first communication protocol. The second transceiver transmits the device identification information to an external device.

12 Claims, 16 Drawing Sheets

(56) References Cited

U.S. PATENT DOCUMENTS

| | | | |
|---|---|---|---|
| 2008/0320187 A1 | 12/2008 | Kim et al. | |
| 2010/0172499 A1 | 7/2010 | Sugiyama | |
| 2010/0262672 A1* | 10/2010 | Sugiyama | G06Q 20/3278 709/208 |
| 2011/0016373 A1 | 1/2011 | Teruyama et al. | |
| 2011/0197203 A1* | 8/2011 | Takeuchi | G06F 9/45512 719/313 |
| 2012/0233618 A1* | 9/2012 | Takeuchi | G06F 9/44505 718/102 |
| 2014/0066045 A1 | 3/2014 | Tanaka et al. | |

FOREIGN PATENT DOCUMENTS

| | | |
|---|---|---|
| JP | 2005-242445 A | 9/2005 |
| JP | 2007-183780 A | 7/2007 |
| JP | 2009-527044 A | 7/2009 |
| JP | 2010-161660 A | 7/2010 |
| JP | 2011-024091 A | 2/2011 |
| WO | 2013/121758 A1 | 8/2013 |

OTHER PUBLICATIONS

Notification of Reasons for Refusal issued in Japanese Application No. 2015-536436 dated Apr. 17, 2018 (with English translation).

\* cited by examiner

COMMUNICATIONS DEVICE AND COMMUNICATIONS SYSTEM

CROSS-REFERENCE TO RELATED APPLICATION

This is a continuation of International Application No. PCT/JP2014/004230 filed on Aug. 19, 2014, which claims priority to Japanese Patent Application No. 2013-187907 filed on Sep. 11, 2013. The entire disclosures of these applications are hereby incorporated by reference.

BACKGROUND

The present disclosure relates to a communications device using multiple protocols.

Integrated circuit (IC) cards that utilize contactless communication technologies have recently been used in various applications including IC transit cards, passports, and electronic money. Among these IC cards, most of Japanese IC transit cards and electronic money adopt a so-called FeliCa™ technology. The FeliCa specifications, defining not only communication protocols but also various command functions including commands to read/write data from/to the card, are standardized as JISX 6319-4.

On the other hand, in quite a few fields, also used are communication protocols defined by ISO/IEC 14443 for passports, driver's licenses, taspo cards and other kinds of IC cards, and a number of command systems defined by ISO/IEC 7816 (hereinafter collectively referred to as "ISO protocols").

Japanese Unexamined Patent Publication No. 2007-183780 discloses a system which stores, in a card, service directory data in a common format for all protocols. Japanese Unexamined Patent Publication No. 2011-24091 discloses a contactless communication technique which uses a communication protocol for transmitting and receiving a frame in a predetermined format in order to transmit and receive a frame in a different format.

However, a card that uses one protocol cannot communicate with a reader/writer that uses another protocol. Thus, only limited coordination is allowed between multiple different applications.

SUMMARY

A communications device according to an embodiment includes: a first transceiver configured to transmit and receive wirelessly a signal compliant with a first communication protocol; a first protocol processor configured to process a first frame included in the signal received by the first transceiver; a second transceiver configured to transmit and receive wirelessly a signal compliant with a second communication protocol; a second protocol processor configured to process a second frame included in the signal received by the second transceiver; a recognizer configured to recognize the communication protocol of the signal received by either the first transceiver or the second transceiver; a command handler configured to handle a command extracted from the first frame; a converter configured to convert a command extracted from the second frame and pass the converted command to the command handler; and a memory configured to store device identification information for use in the first communication protocol. The second transceiver transmits the device identification information to an external device.

A communications system according to an embodiment includes a communications device, a first device, and a second device. The first device transmits and receives wirelessly signal compliant with a first communication protocol to/from the communications device. The second device transmits and receives wirelessly a signal compliant with a second communication protocol to/from the communications device. The communications device includes: a first transceiver configured to transmit and receive the signal compliant with the first communication protocol; a first protocol processor configured to process a first frame represented by the signal received by the first transceiver; a second transceiver configured to transmit and receive the signal compliant with the second communication protocol; a second protocol processor configured to process a second frame included in the signal received by the second transceiver; a recognizer configured to recognize the communication protocol of the signal received by either the first transceiver or the second transceiver; a command handler configured to handle a command extracted from the first frame; a converter configured to convert a command extracted from the second frame and pass the converted command to the command handler; and a memory configured to store device identification information for use in the first communication protocol. The second transceiver transmits the device identification information to the second device.

These configurations allow a single communications device to handle commands included in frames that have been transmitted in compliance with multiple different communication protocols.

DETAILED DESCRIPTION

Figure 1:
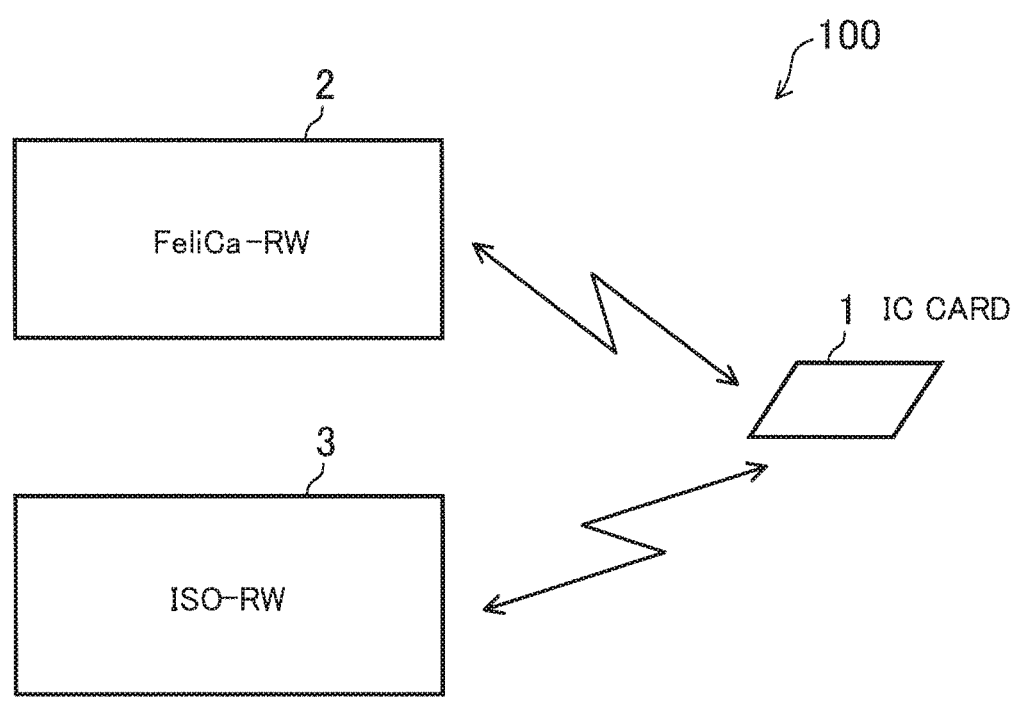
FIG. 1 is a block diagram illustrating the configuration of a communications system according to an exemplary embodiment.

Various embodiments will now be described with reference to the accompanying drawings, throughout which the same reference numeral denotes the same or similar components.

Definitions of Terms

The term "communications device" refers herein to an IC card (which is also called a "smart card") or tag compliant with a contactless near field wireless communication standard such as FeliCa™, MIFARE™, and NFC, and a reader/writer used with any of them. As used herein, "contactless" means that a terminal extended from an IC chip in the card is not connected to the reader/writer via a cable or wire. Thus, even if the IC card is put in physical contact with the reader/writer, their communication may still be called "contactless communication." In particular, the reader/writer will be sometimes hereinafter referred to as a "device."

The term "near field communication (NFC)" generally refers to a near field wireless communication technology which uses a frequency of 13.56 MHz within approximately 10 cm of the reader antenna. In a narrower sense, the NFC refers to a communication technology defined by the international standard ISO/IEC 18092 (NFCIP-1). In a broader sense, the NFC covers not only NFCIP-1 but also NFC Forum specifications, which are implementation standards established by NFC Forum, an industry-wide standard group.

The term "communication protocol" (which is also called an "air protocol") refers herein to a set of specifications provided for a contactless near field communication (NFC). In a broader sense, the communication protocol refers herein to a physical shape, wireless specifications, collision detection and anticollision, and communication protocol. The communication protocol of FeliCa is defined by JISX 6319-4, and the communication protocol of MIFARE is defined by ISO/IEC 14443.

The term "frame" refers herein to a sequence including data bits and an optional error detection bit. A frame delimiter is added to the beginning and end of each frame.

Functional blocks, whose name ends in most cases with the suffix "-er" or "-or" (such as a "processor"), are shown and described for illustrative purposes only. A single functional block may include a plurality of elements. Conversely, a plurality of functional blocks may be implemented as a single element. In addition, a functional block may also be configured as a piece of software, a piece of hardware, or a combination of software and hardware.

The term "application" refers herein to an application program which uses such an IC card.

General Outline of System

FIG. 1 illustrates a communications system 100 which uses communications devices according to an embodiment. An IC card 1, a FeliCa reader/writer (hereinafter simply referred to as a "FeliCa-RW") 2, and an ISO reader/writer (hereinafter simply referred to as an "ISO-RW") 3 each function as a communications device. As will be described later, the IC card 1 stores both a FeliCa application file and an ISO application file.

The FeliCa-RW 2 accesses the IC card 1 by using the communication protocol and command system defined by FeliCa. Communication between the IC card 1 and the FeliCa-RW 2 is defined by JISX 6319-4, for example. The ISO-RW 3 accesses the IC card 1 by using the communication protocol and command system defined by ISO. Communication between the IC card 1 and the ISO-RW 3 is defined by ISO/IEC 14443, for example. As used herein, "access" refers to various kinds of processing to execute an application including selecting a desired application, mutual authentication, and accessing a file stored in the IC card 1.

Structure of IC Card

Figure 2:
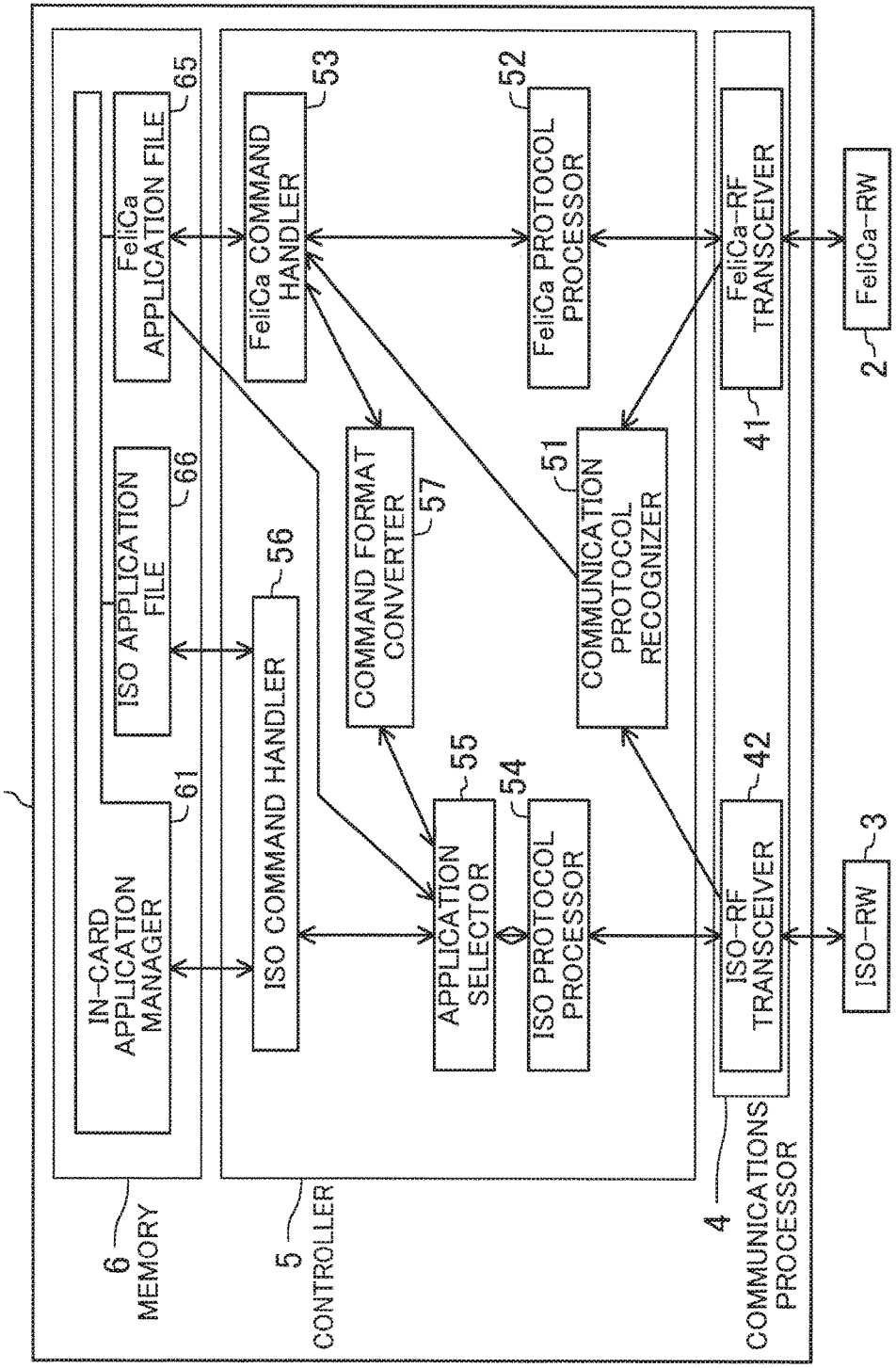
FIG. 2 is a block diagram illustrating the configuration of a communications device according to an exemplary embodiment.

FIG. 2 illustrates the structure of the IC card 1. A communications processor 4 includes a FeliCa-RF transceiver 41 and an ISO-RF transceiver 42. The FeliCa-RF transceiver 41 transmits and receives wirelessly a signal (e.g., a RF (radio frequency) signal with a frequency of 13.56 MHz) compliant with a FeliCa protocol (JISX 6319-4). The ISO-RF transceiver 42 transmits and receives wirelessly a signal compliant with an ISO protocol (e.g., ISO/IEC 14443).

A controller 5 is a functional block which is typically implemented as a combination of a central processing unit (CPU) and a program stored in the memory 6, and processes the data transmitted and received by the IC card 1. The controller 5 includes a FeliCa protocol processor 52 and an ISO protocol processor 54. The FeliCa protocol processor 52 processes a frame included in a signal that has been received by the FeliCa-RF transceiver 41. The ISO protocol processor 54 processes a frame included in a signal that has been received by the ISO-RF transceiver 42.

The controller 5 further includes a communication protocol recognizer 51, a FeliCa command handler 53, an application selector 55, an ISO command handler 56, and a command format converter 57. The communication protocol recognizer 51 recognizes the communication protocol of a signal received by either the FeliCa-RF transceiver 41 or the ISO-RF transceiver 42. The FeliCa command handler 53 handles a command extracted from a frame that has been processed by the FeliCa protocol processor 52.

The application selector 55 selects one of a plurality of applications in accordance with a given application selection command, which specifies one of the application identification codes that are respectively allocated to the plurality of applications. The ISO command handler 56 handles a command extracted from a frame that has been processed by the ISO protocol processor 54. The command format converter 57 converts the command extracted from the frame that has been output by the ISO protocol processor 54 and gives the converted command to the FeliCa command handler 53.

A memory 6 is a general implementation of the storage, and may more particularly be a nonvolatile memory such as an electrically erasable programmable ROM (EEPROM) or a ferroelectric memory (FeRAM). The memory 6 stores a file to be used in an application and information for use to manage such a file. More specifically, the memory 6 stores device identification information for use in a communication protocol such as the FeliCa protocol. In one embodiment, the ISO-RF transceiver 42 transmits the device identification information to the reader/writer 2 or 3. The reader/writer 2 or 3 may use the device identification information to handle a given command.

Figure 3:
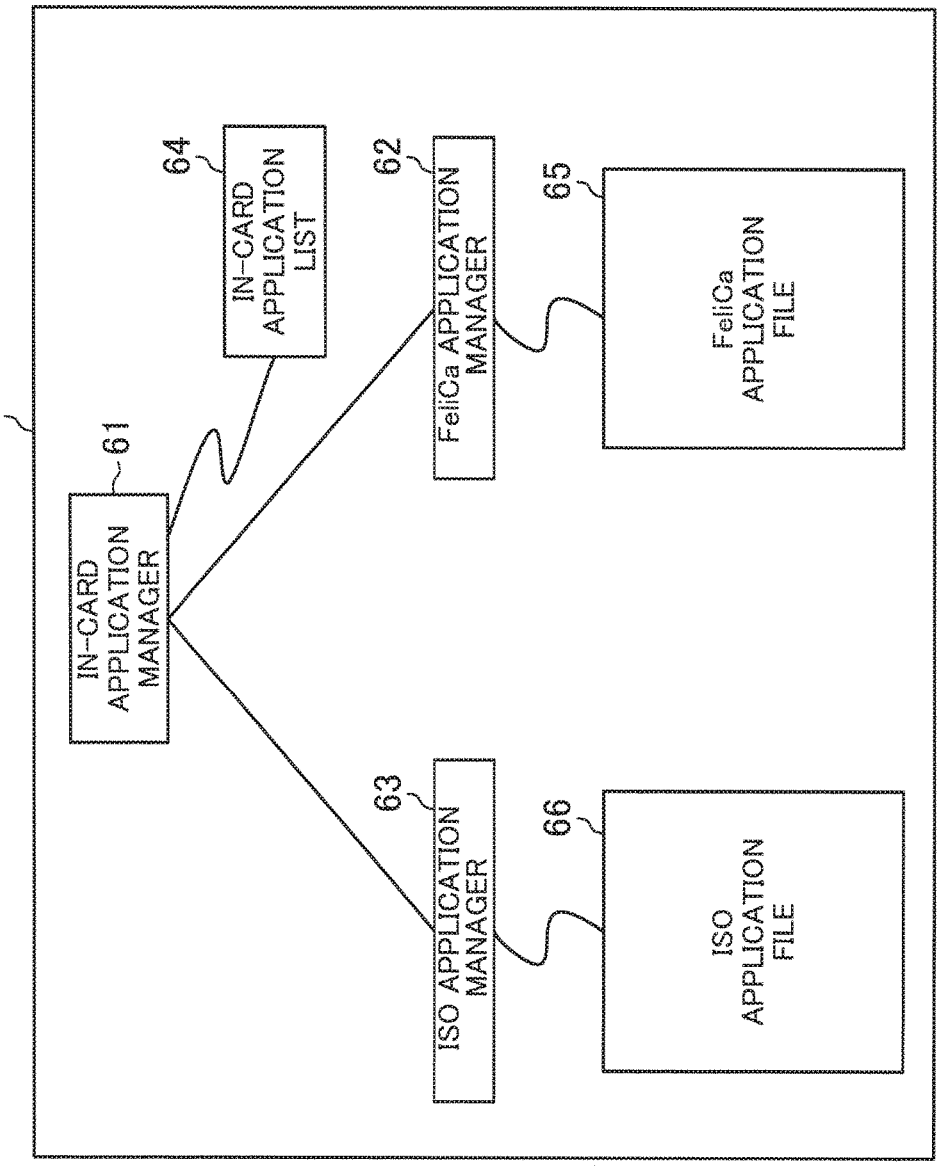
FIG. 3 is a block diagram illustrating the configuration of the memory of a communications device according to an exemplary embodiment.

FIG. 3 illustrates a detailed configuration of the memory 6. The IC card 1 shown in FIG. 3 stores a plurality of applications in the memory 6. Examples of those applications include a FeliCa application and an ISO application. The memory 6 may store three or more applications as well.

The memory 6 stores, in its hierarchical data structure, an in-card application manager 61, a FeliCa application manager 62 which manages FeliCa applications, and an ISO application manager 63 which manages ISO applications. The in-card application manager 61 manages all of the applications installed in the IC card 1. The in-card application manager 61 manages those applications by reference to an in-card application list 64, which is a list of applications stored in the memory 6 and more particularly describes application identification codes that are uniquely allocated to the respective applications. The FeliCa application manager 62 and the ISO application manager 63 manage a FeliCa application file 65 and an ISO application file 66, respectively, which store data to be used in their own applications.

In the system 100, the FeliCa-RW 2 and ISO-RW 3 are each able to access the FeliCa application file 65 and/or ISO application file 66 in the card 1. In this embodiment, the FeliCa-RW 2 accesses only the FeliCa application file 65, whereas the ISO-RW 3 accesses both the FeliCa application file 65 and the ISO application file 66.

Frame Format

Figure 4:
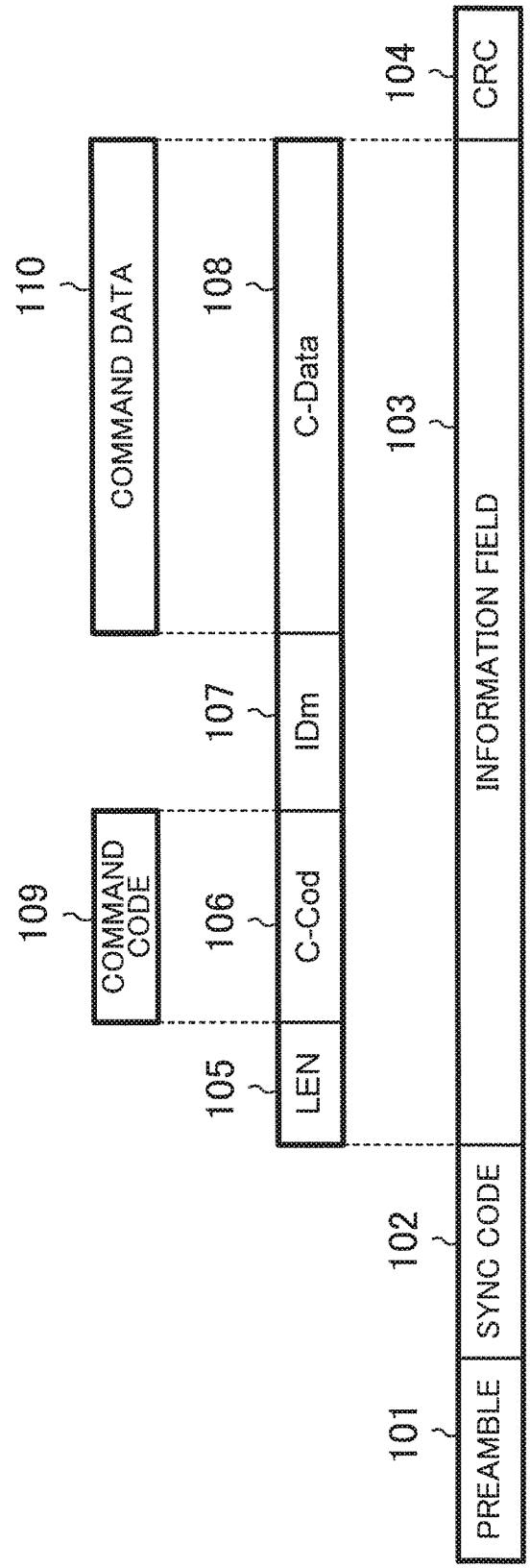
FIG. 4 illustrates the format of a frame exchanged between a device and a communications device according to an exemplary embodiment.

FIG. 4 illustrates the format of a frame (which is also called a "packet") that the FeliCa-RF transceiver 41 receives from the FeliCa-RW 2 in order to access the FeliCa application file 65. An exemplary flow of processing to be performed when the FeliCa-RW 2 accesses the FeliCa application file 65 will be described with reference to FIGS. 2 and 4. In FIG. 4, a preamble 101 and a sync code 102 are pieces of information to establish synchronization in transmitting a frame. An information field 103 is the body of the frame and is also called a "payload." A CRC 104 is an error detection code with respect to the information field 103.

On receiving a frame in such a format, the FeliCa-RF transceiver 41 checks, by the CRC 104, if any communication error occurred when this frame was received. If the answer is NO, the FeliCa-RF transceiver 41 notifies the communication protocol recognizer 51 that the communication protocol currently used is the FeliCa protocol, and passes the information field 103 to the FeliCa protocol processor 52.

The information field 103 includes a LEN 105 indicating the length of the information field 103, a C-Cod 106 indicating the name of the command (such as read or write), a code IDm 107 to identify this IC card 1 uniquely, and C-Data 108 which is command data. If the C-Data 108 is a write command, for example, the C-Data 108 includes write data, information about its length, and other pieces of information.

The FeliCa protocol processor 52 determines, by reference to the IDm 107, whether or not the given frame is addressed to itself. If the answer is YES, the FeliCa protocol processor 52 extracts the C-Cod 106 and the C-Data 108 and gives them as a command code 109 and command data 110, respectively, to the FeliCa command handler 53. These are compliant with the FeliCa command system.

On receiving these pieces of information, the FeliCa command handler 53 performs an appropriate type of processing on them depending on the command code 109. For example, if the command code 109 indicates that this is a read command, then the FeliCa command handler 53 reads data specified by the command data 110 from the FeliCa application file 65.

Figure 5:
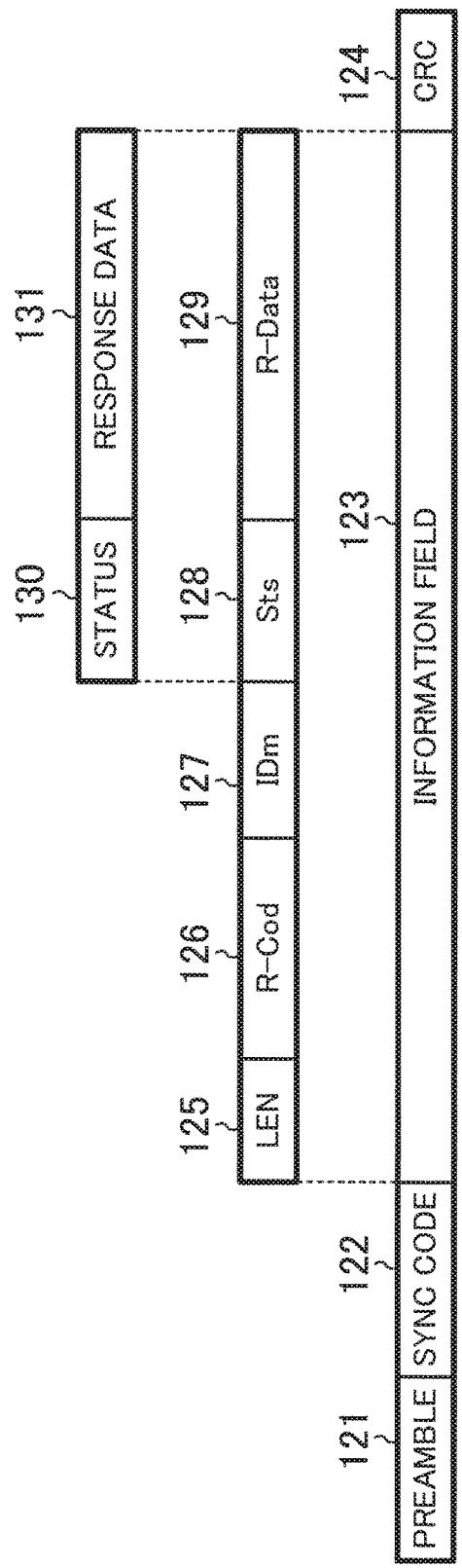
FIG. 5 illustrates the format of a frame exchanged between a device and a communications device according to an exemplary embodiment.

FIG. 5 illustrates the format of a response frame received from the IC card 1. An exemplary flow of processing to be performed when a response is returned from the IC card 1 to the FeliCa-RW 2 in accordance with a given command will be described with reference to FIGS. 2 and 5. By reference to the information retained in the communication protocol recognizer 51, the FeliCa command handler 53 recognizes the communication protocol currently used to be the FeliCa protocol. In this case, the FeliCa command handler 53 passes the data thus read and a result of the processing as response data 131 and status 130, respectively, to the FeliCa protocol processor 52. As used herein, the "result of processing" may be data indicating whether or not the command handling has ended normally.

The FeliCa protocol processor 52 enters these pieces of information received into an R-Data 129 and an Sts 128, respectively. In addition, the FeliCa protocol processor 52 further enters a predetermined value associated with the command code 106 into a response code (R-Cod) 126, enters the same value as the IDm 107 received while the command was received into an IDm 127, and then passes an information field 123 to the FeliCa-RF transceiver 41. Note that the FeliCa protocol processor 52 enters the length of the information field 123 into a LEN 125.

The FeliCa-RF transceiver 41 calculates a CRC 124 with respect to the information field 123, adds it to the frame, further adds a preamble 121 and a sync code 122 to the frame, and then transmits the frame to the FeliCa-RW 2.

This is an exemplary flow of a series of processing steps to be performed in response to a single given command. This series of processing steps will be performed repeatedly the same number of times as that of the commands to handle. As a result, the FeliCa-RW 2 can execute the FeliCa applications installed in the IC card 1. In this embodiment, the communication protocol recognizer 51 retains information about the communication protocol currently used, and the FeliCa command handler determines the destination of the response by reference to this piece of information, which is a major difference from conventional systems.

Figure 6:
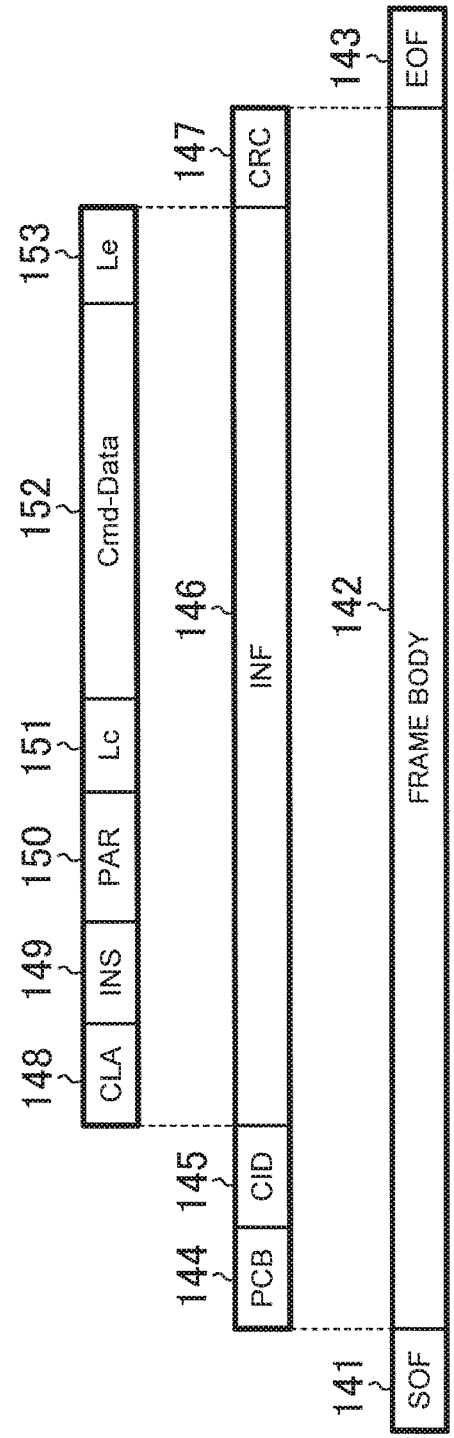
FIG. 6 illustrates the format of a frame exchanged between a device and a communications device according to an exemplary embodiment.

FIG. 6 illustrates the format of a frame that the ISO-RF transceiver 42 receives from the ISO-RW 3. An exemplary flow of processing to be performed when the ISO-RW 3 executes an ISO application will be described with reference to FIGS. 2 and 6. If the IC card 1 is provided with a plurality of applications that can be processed by the ISO-RW 3, one of those applications first needs to be selected. Thus, first, the ISO-RW 3 selects the in-card application manager 61. Specifically, the ISO-RW 3 transmits a command to select the in-card application manager 61 on a flame with the format shown in FIG. 6 to the IC card 1.

The signals SOF (start of frame) 141 and EOF (end of frame) 143 shown in FIG. 6 respectively represent the start and end of a frame. On receiving such a frame with an SOF and an EOF, the ISO-RF transceiver 42 notifies the communication protocol recognizer 51 that this frame is compliant with the ISO protocol, and passes the body 142 of the frame to the ISO protocol processor 54.

The frame body 142 includes a PCB 144 indicating the type of the frame, a CID 145 for use to determine whether or not this frame is addressed to itself, an INF 146 for transmitting command information, and an error detection code (e.g., a cyclic redundancy code (CRC)) 147. The ISO protocol processor 54 determines, by the CID 145, whether or not this frame is addressed to itself. If the answer is YES, the ISO protocol processor 54 checks, by the CRC 147, if any communication error occurred when this frame was received. If the answer is NO, the ISO protocol processor 54 passes the INF 146 to the application selector 55.

The INF 146 includes a CLA 148 indicating the classification of the command, an INS 149 indicating the name of the command (such as read or write), a command parameter (PAR) 150, a Lc 151 indicating the length of Cmd-Data 152 that follows the Lc 151, the Cmd-Data 152 that is the command data, and a Le 153 indicating the maximum length of receivable response. The CLA 148 is used to determine whether the code represented by the INS 149 and the PAR 150 is compliant with a command system defined by ISO or a code unique to the given application. If the given command is a write command, for example, a write address and write data are entered into the PAR 150 and the Cmd-Data 152, respectively. Not that if the given command includes no command data (e.g., if the given command is a read command,) then no Lc 151 is added. Also, if the given command requires sending no data as a response (e.g., if the given command is a write command), then no Le 153 is added.

If the given command is a command to select the in-card application manager 61, then a code indicating that this is an ISO command system is entered into the CLA 148 and a code indicating that this is a selection command is entered into the INS 149. Also, a code indicating that the target to select is an application is entered into the PAR 150. In this case, the in-card application manager 61 is included in applications in a broad sense which are used to manage applications in the card. Furthermore, a code indicating that the target to select is the in-card application manager 61 is entered into the Cmd-Data 152. This code is the application identification code described above. As in the FeliCa applications and ISO applications, a unique application identification code is also assigned to the in-card application manager 61.

On receiving the application selection command described above, the application selector 55 stores information indicating that the application currently selected is the in-card application manager 61 and then passes the INF 146 to the ISO command handler 56. Since the target to select is the in-card application manager 61, the ISO command handler 56 reads information from the in-card application list 64, which includes the identification codes of all applications installed within the IC card 1.

Figure 7:
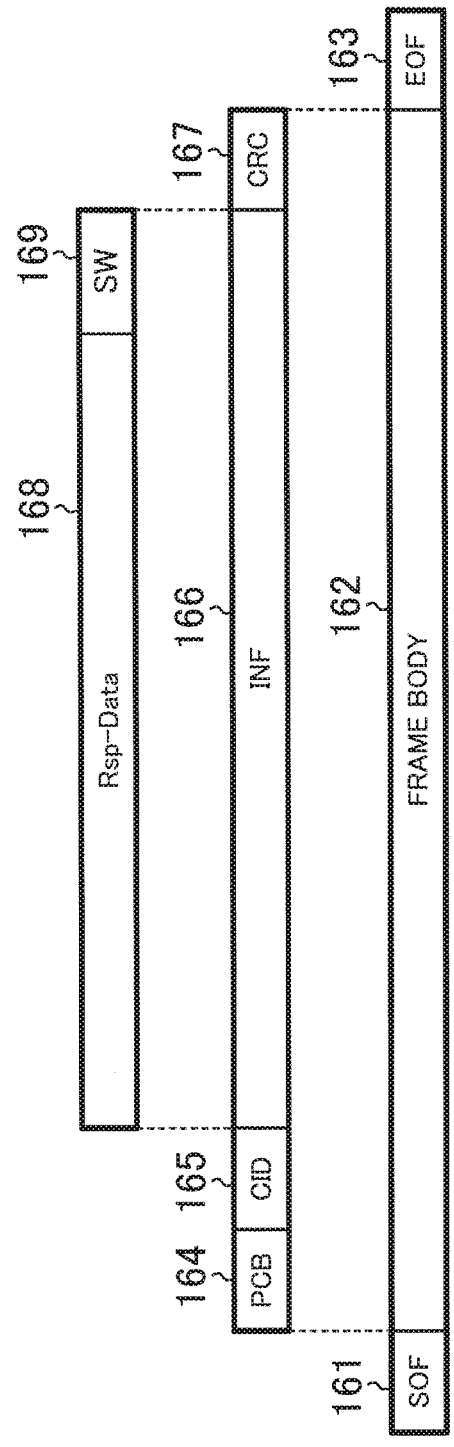
FIG. 7 illustrates the format of a frame exchanged between a device and a communications device according to an exemplary embodiment.

FIG. 7 illustrates the format of a response frame received from the IC card 1. An exemplary flow of the processing to be performed when the IC card 1 returns a response to the ISO-RW 3 in accordance with the command received will be described with reference to FIGS. 2 and 7. If the given command is a command to select the in-card application manager 61, the ISO command handler 56 enters the read data described above into Rsp-Data 168 and also enters a result of handling into a SW 169, and passes them to the ISO protocol processor 54 via the application selector 55. In this case, the read data may be a code to identify every application provided in the IC card 1. The result of handling may be data indicating whether or not the command handling has ended normally.

The ISO protocol processor 54 enters the pieces of information received into an INF 166. In addition, the ISO protocol processor 54 also enters the same value as the CID 145 gotten when the command was received into a CID 165, further enters a value indicating the type of the frame into a PCB 164, calculates a CRC 167 with respect to these pieces of information, adds it to the frame, and then passes the flame to the ISO-RF transceiver 42. In response, the ISO-RF transceiver 42 enters these pieces of information received into a frame body 162, adds an SOF 161 and an EOF 163 respectively indicating the start and end of the frame to the frame, and then transmits the frame to the ISO-RW 3.

The application identification code is defined to identify unambiguously various applications that may be used in the communications system 1. As a result, in various kinds of systems that use the IC card 1, the ISO-RW3 can identify various applications installed in the IC card 1.

The ISO-RW 3 senses, based on the response received, that the ISO application to execute is contained in the IC card 1. The ISO-RW 3 in turn transmits a selection command to select this ISO application to the IC card 1. This selection command has the same structure as the frame used to select the in-card application manager 61, except that the application identification code specified by the command data 152 indicates the ISO application manager 63. On receiving this command, the ISO-RF transceiver 42 and ISO protocol processor 54 perform the same processing as what has already been described.

The application selector 55 senses, based on the command received, that the target to select is the ISO application manager 63. In this case, the application selector 55 stores the information that the application currently selected is the ISO application manager 63, and then passes the INF 146 of the given frame to the ISO command handler 56. In response, the ISO command handler 56 reads the attribute information of that application from the ISO application manager 63 and enters that attribute information into the response data (Rsp-Data) 168. Examples of the attribute information of the application include information about how to determine the right of access and information about functions supported. The flow of the processing to be performed until a response to that command is transmitted to the ISO-RW 3 is the same as in the situation where a response to a command to select the in-card application manager 61 is transmitted as described above.

Next, it will be described in what flow the ISO-RW 3 performs application processing on the ISO application manager 63 that has been selected as described above. As an example, it will be described how data is read from the ISO application file 66. When the read command is received from the ISO-RW 3, the ISO-RF transceiver 42 and ISO protocol processor 54 perform the same processing as what has already been described.

Since the application selector 55 retains information that the application currently selected is the ISO application manager 63, the application selector 55 passes the command received (i.e., the INF 146) to the ISO command handler 56. As per that command, the ISO command handler 56 reads data from the ISO application file 66 and enters that data into the Rsp-Data 168. The flow of the processing to be performed until a response to that command is transmitted to the ISO-RW 3 is the same as in the situation where a response to a command to select the in-card application manager 61 is transmitted as described above.

This series of processing allows the ISO-RW 3 to select a desired ISO application from the plurality of applications installed in the IC card 1 and to access the file of that application. In this embodiment, the communication protocol recognizer 51 retains information about the communication protocol currently used, which is a difference from conventional systems.

Figure 8:
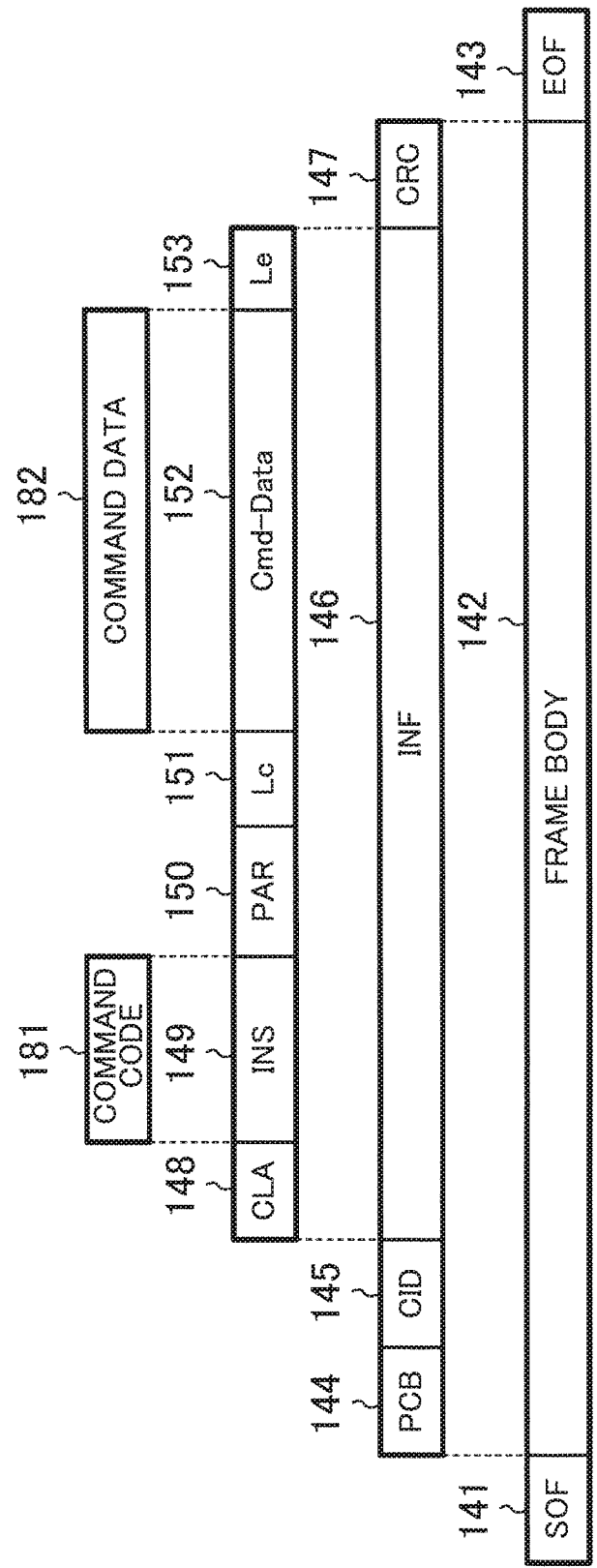
FIG. 8 illustrates the format of a frame exchanged between a device and a communications device according to an exemplary embodiment.

FIG. 8 illustrates the format of a frame that the ISO-RF transceiver 42 receives from the ISO-RW 3. An exemplary flow of processing to be performed when the ISO-RW 3 accesses the FeliCa application file 65 will be described with reference to FIGS. 2 and 8. The flow of the processing to be performed until the ISO-RW 3 selects the in-card application manager 61 first, and then senses, based on that response, what applications are installed in the IC card 1 is the same as what has already been described.

On sensing that the FeliCa application to execute is contained in the IC card 1, the ISO-RW 3 transmits a selection command to select this FeliCa application to the IC card 1. This selection command has the same structure as the frame used to select the in-card application manager 61, except that the application identification code specified by the command data 152 indicates the FeliCa application manager 62. On receiving this command, the ISO-RF transceiver 42 and ISO protocol processor 54 perform the same processing as what has already been described.

The application selector 55 senses, based on the command received, that the target to select is the FeliCa application manager 62. In this case, the application selector 55 stores the information that the application currently selected is the FeliCa application manager 62, and then reads the attribute information from the FeliCa application manager 62 and enters that attribute information into the response data 168. In this case, the attribute information may be data indicating the version number of the FeliCa application, for example. The flow of the processing to be performed until a response to that command is transmitted to the ISO-RW 3 is the same as in the situation where a response to a command to select the in-card application manager 61 is transmitted as described above.

Next, it will be described in what flow the ISO-RW 3 performs application processing on the FeliCa application manager 62 that has been selected as described above. As an example, it will be described how data is read from the FeliCa application file 65. When the read command is received from the ISO-RW 3, the ISO-RF transceiver 42 and ISO protocol processor 54 perform the same processing as what has already been described.

Since the application selector 55 retains information that the application currently selected is the FeliCa application manager 62, the application selector 55 passes the command received (i.e., the INF 146) to the command format converter 57.

In response, the command format converter 57 extracts an INS 149 and Cmd-Data 152 from an INF 146 received as shown in FIG. 8, and passes them as a command code 181 and command data 182, respectively, to the FeliCa command handler 53. In this case, as the command code 181 and the command data 182, the same code and data as the command code 109 and command data 110 shown in FIG. 4 that have already been described as to a situation where the FeliCa-RW 2 accesses the FeliCa application have been mapped onto the frame received. This thus allows the FeliCa command handler 53 to read data from the FeliCa application file 65 by performing the same processing as when the FeliCa-RW 2 accesses the FeliCa application.

Figure 9:
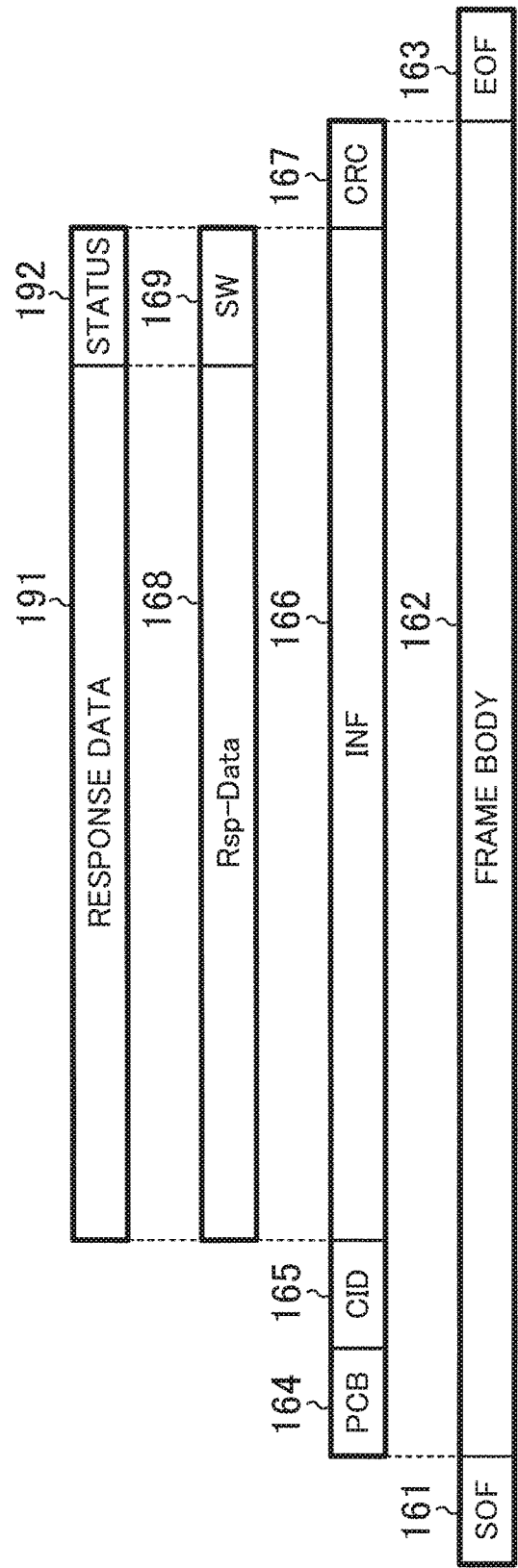
FIG. 9 illustrates the format of a frame exchanged between a device and a communications device according to an exemplary embodiment.

FIG. 9 illustrates the format of a response frame received from the IC card 1. An exemplary flow of processing to be performed when the IC card 1 returns a response to a read command will be described with reference to FIGS. 2 and 9. By reference to the information retained in the communication protocol recognizer 51, the FeliCa command handler 53 recognizes the communication protocol currently used to be the FeliCa protocol. In this case, the FeliCa command handler 53 passes the data thus read and a result of the handling as response data 191 and a status 192, respectively, to the command format converter 57. As used herein, the "result of handling" may be data indicating whether or not the command handling has ended normally. In this case, the response data 191 and the status 192 may be the same as the response data 131 and the status 130, respectively, as shown in FIG. 4. The command format converter 57 passes the response data 191 and status 192 thus received as Rsp-Data 168 and SW 169, respectively, to the ISO protocol processor 54. After that, the ISO protocol processor 54 and the ISO-RF transceiver 42 will perform the same processing as what has already been described.

This series of processing allows the ISO-RW 3 to select a desired FeliCa application from the plurality of applications installed in the IC card 1 and to access the file of that application. In other words, the ISO-RW 3 can perform the same processing as the one performed by the FeliCa-RW 2 on the FeliCa application. Such execution of the FeliCa application by the ISO-RW 3 is a novel one that has never been done by any conventional system.

Command Handling Flow

Figure 10:
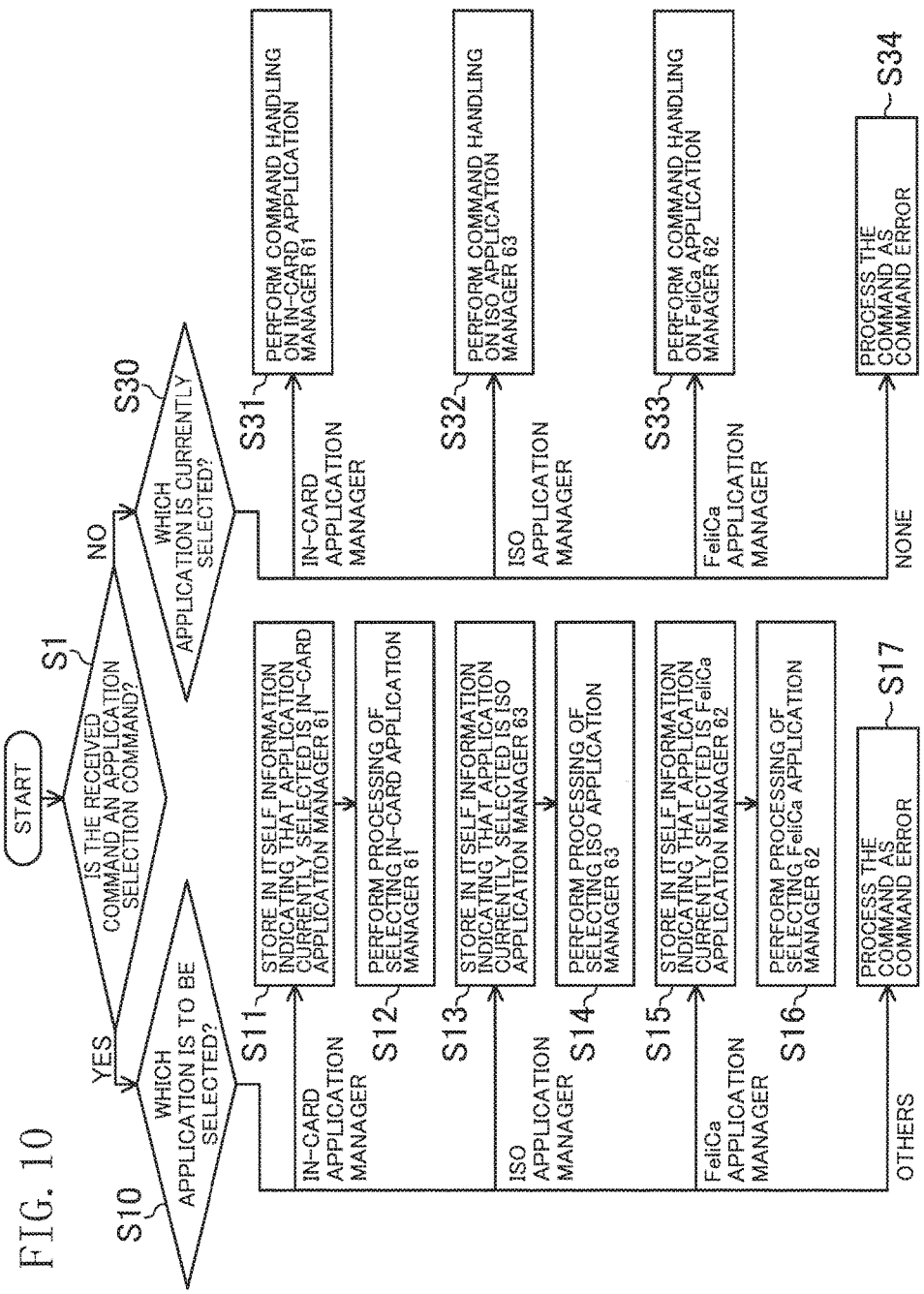
FIG. 10 is a flowchart showing the procedure in which a communications device according to an exemplary embodiment identifies a given command.

FIG. 10 is a flowchart showing the procedure of identifying a received command according to an embodiment. This flow includes processing to be performed by the application selector 55 and processing to be performed by either the ISO command handler 56 or the FeliCa command handler 53. Now, it will be described in detail with reference to FIG. 10 exactly how the application selector 55 distinguishes an application selection command from an application processing command (such as a read command).

First, the application selector 55 determines whether or not the received command is an application selection command (in step S1). Even while executing some application processing (more specifically, after the application selector 55 has transmitted a response to a command to process some application and while the application selector 55 is waiting for the next command with respect to that application to arrive), the application selector 55 does accept an application selection command preferentially, and therefore, can select another application.

If an application selection command has been received, an application to select is distinguished by an application identification code specified by that command (in step S10). If the target to select is the in-card application manager 61, the application selector 55 stores in itself information indicating that the application currently selected is the in-card application manager 61 (in step S11). Thereafter, the ISO command handler 56 performs the processing of selecting the in-card application manager 61 (such as reading the in-card application list 64) (in step S12). Even if the target to select is the ISO application manager 63, the processing will be performed in the same way (in steps S13 and S14). Even if the target to select is the FeliCa application manager 62, the processing will also be performed in the same way (in steps S15 and S16) except that the application selector 55 performs the processing step S16. Note that if the application to select is not included in the given IC card 1, the command is processed as a command error (in step S17).

On the other hand, if the received command is not an application selection command, then the application selector 55 regards the command as a command with respect to with the application already selected, and determines what the application currently selected is (in step S30). This determination is made based on the information that has been stored in any of the processing steps S11, S13 and S15.

If the application currently selected is the in-card application manager 61, then the ISO command handler 56 performs command handling (including getting the size of an available area and adding an application, for example) on the in-card applications manager 61 (in step S31). Likewise, even if the application currently selected is the ISO application manager 63, the ISO command handler 56 also performs command handling (including reading the ISO application file 66, for example) on the ISO application manager 63 (in step S32). Meanwhile, if the application currently selected is the FeliCa application manager 62, then the FeliCa command handler 53 performs command handling (including reading the FeliCa application file 65, for example) on the FeliCa application manager 62 (in step S33). Alternatively, if no application has been selected yet, then the command is processed as a command error (in step S34).

In this case, no matter whether the received command is an application selection command or not, the command received by the application selector 55 always has the format represented by the CLA 148 through Le 153 shown in FIG. 6 or 8. The application selection command and a group of commands with respect to the ISO application manager 63 are both commands compliant with the ISO system. In the case of commands compliant with the ISO system, the INS 149 varies from one command to another. This thus allows for distinguishing reliably the application select on command from the group of other commands. On the other hand, as for the group of commands with respect to the FeliCa application manager 62, the command code 181 is determined independently of the ISO system, and therefore, may possibly overlap with the INS 149 of the application selection command. However, if the received command is an application selection command belonging to the commands of the ISO system, the CLA 148 indicates that this is a command compliant with the ISO system. More specifically, the CLA 148 having a length of 1 byte has its most significant bit set to be "0." On the other hand, if the received command is one of the group of commands with respect to the FeliCa application manager 62, the command may be indicated explicitly as a unique command by setting the most significant bit of the CLA 148 to be one. This allows for distinguishing reliably the application selection command from the group of commands with respect to the FeliCa application manager 62, thus enabling processing properly the branch of the processing step S1.

In the embodiment described above, a plurality of applications are supposed to be installed in the IC card 1. If just the FeliCa application is installed there, however, there is no need to perform such application selection processing. In that case, even if the ISO-RW 3 executes the FeliCa application, the command for the FeliCa application manager 62 may be transmitted from the beginning.

Besides the format of the frame it handles, the ISO protocol is also different from the FeliCa protocol in other respects. For example, although it has already been described with reference to FIGS. 5 and 9 that the statuses 130 and 192 are entered into the Sts 128 and the SW 169, respectively, some FeliCa commands have no statuses 130 or 192. In the case of such a command, if the command ends up with an abnormal termination, what to do next is determined in accordance with each protocol. Specifically, no response needs to be returned in accordance with the FeliCa protocol. On the other hand, in accordance with the ISO protocol, some processing result SW 169 needs to be returned.

To achieve this, two kinds of status codes respectively indicating "normal termination" and "abnormal termination" are newly defined with respect to responses to only FeliCa commands having no statuses 130 or 192. Handling of these status codes will now be described with reference to FIG. 11.

Figure 11:
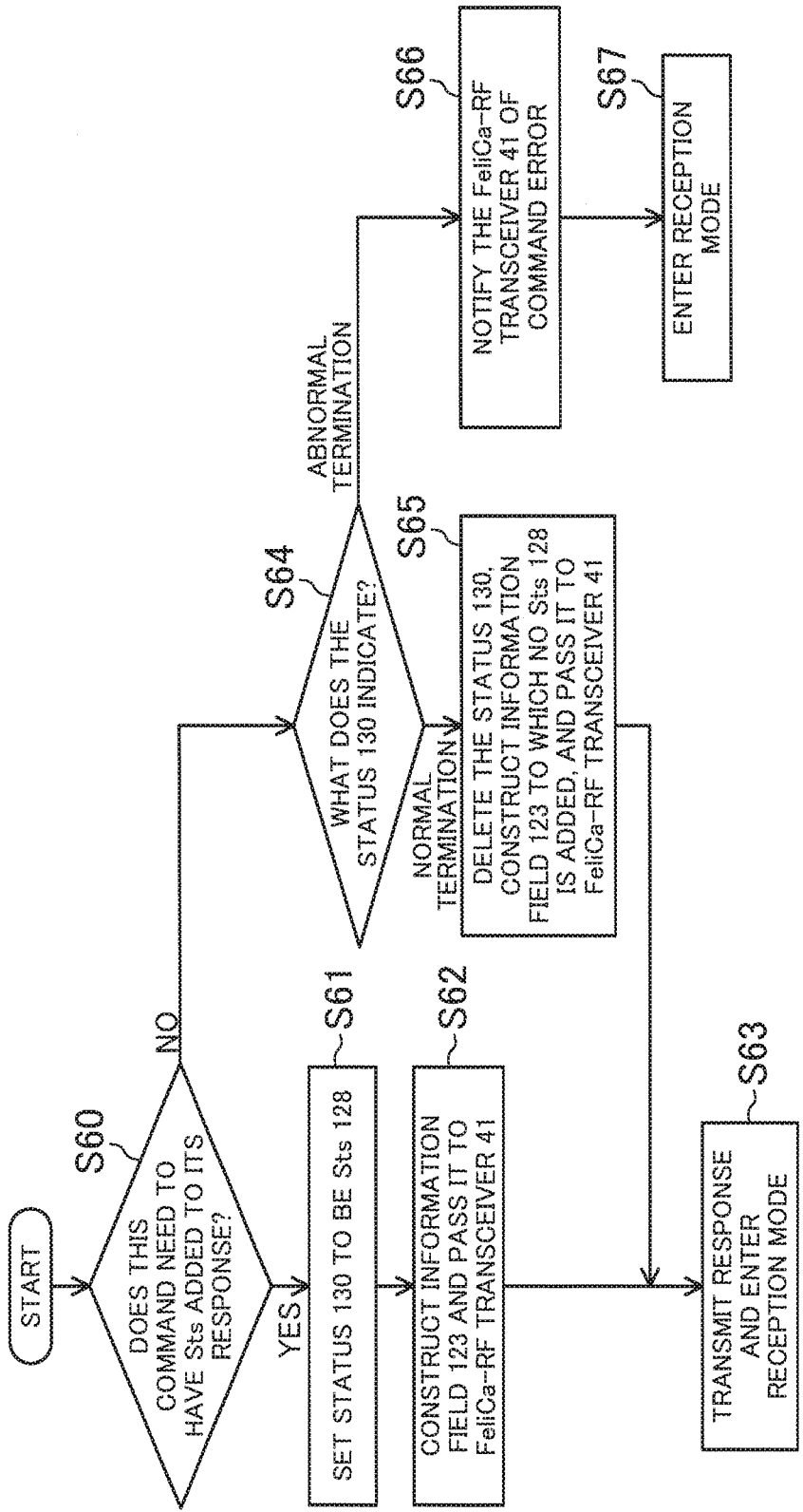
FIG. 11 is a flowchart showing the procedure in which a communications device according to an exemplary embodiment performs status processing.

FIG. 11 is a flowchart showing a status processing method according to an embodiment. This flow includes processing to be performed by the FeliCa protocol processor 52 and processing to be performed by the FeliCa-RF transceiver 41.

First, the FeliCa protocol processor 52 determines, by the command code 109 of the command currently handled, whether or not the command requires adding a Sts 128 to its response (in step S60). If the answer is YES, the FeliCa protocol processor 52 enters the status 130 into the Sts 128 as it is (in step S61), constructs an information field 123 and then passes it to the FeliCa-RF transceiver 41 (in step S62). The FeliCa-RF transceiver 41 transmits the response to the FeliCa-RW 2, and then switches to a reception mode to wait for the next command to arrive (in step S63).

On the other hand, if the answer to the question of step S60 is NO, then the FeliCa protocol processor 52 determines whether the status 130 indicates a "normal termination" or an "abnormal termination" (in step S64). If the status 130 indicates a "normal termination," the FeliCa protocol processor 52 deletes the status 130, constructs an information field 123 to which no Sts 128 is added, and then passes it to the FeliCa-RF transceiver 41 (in step S65). In response, the FeliCa-RF transceiver 41 transmits the response to the FeliCa-RW 2 and then switches to the reception mode to wait for the next command to arrive (in step S63).

If the status 130 indicates an "abnormal termination," the FeliCa protocol processor 52 notifies the FeliCa-RF transceiver 41 that the command ends up with a command error (in step S66). In that case, the FeliCa-RF transceiver 41 returns no response to the FeliCa-RW 2 and then switches to the reception mode to wait for the next command to arrive (in step S67).

With respect to the processing to be performed by the ISO protocol processor 54, on the other hand, the status 192 (including a code indicating a "normal termination" or an "abnormal termination") is converted into a code compliant with the ISO system and entered into the SW 169, irrespective of the type of the FeliCa command received.

Since the FeliCa commands are a proprietary command set, the code to be entered into the SW 169 may also be determined independently. Thus, the status does not have to be converted into a code compliant with the ISO system. However, if the ISO-RW 3 is compatible with both FeliCa applications and ISO applications, sharing common status codes in the two systems allows some processing steps to be commonly utilized, and thus, may be advantageous.

This allows for performing processing in compliance with both of the FeliCa and ISO protocols.

Reader/Writer Structure

Figure 12:
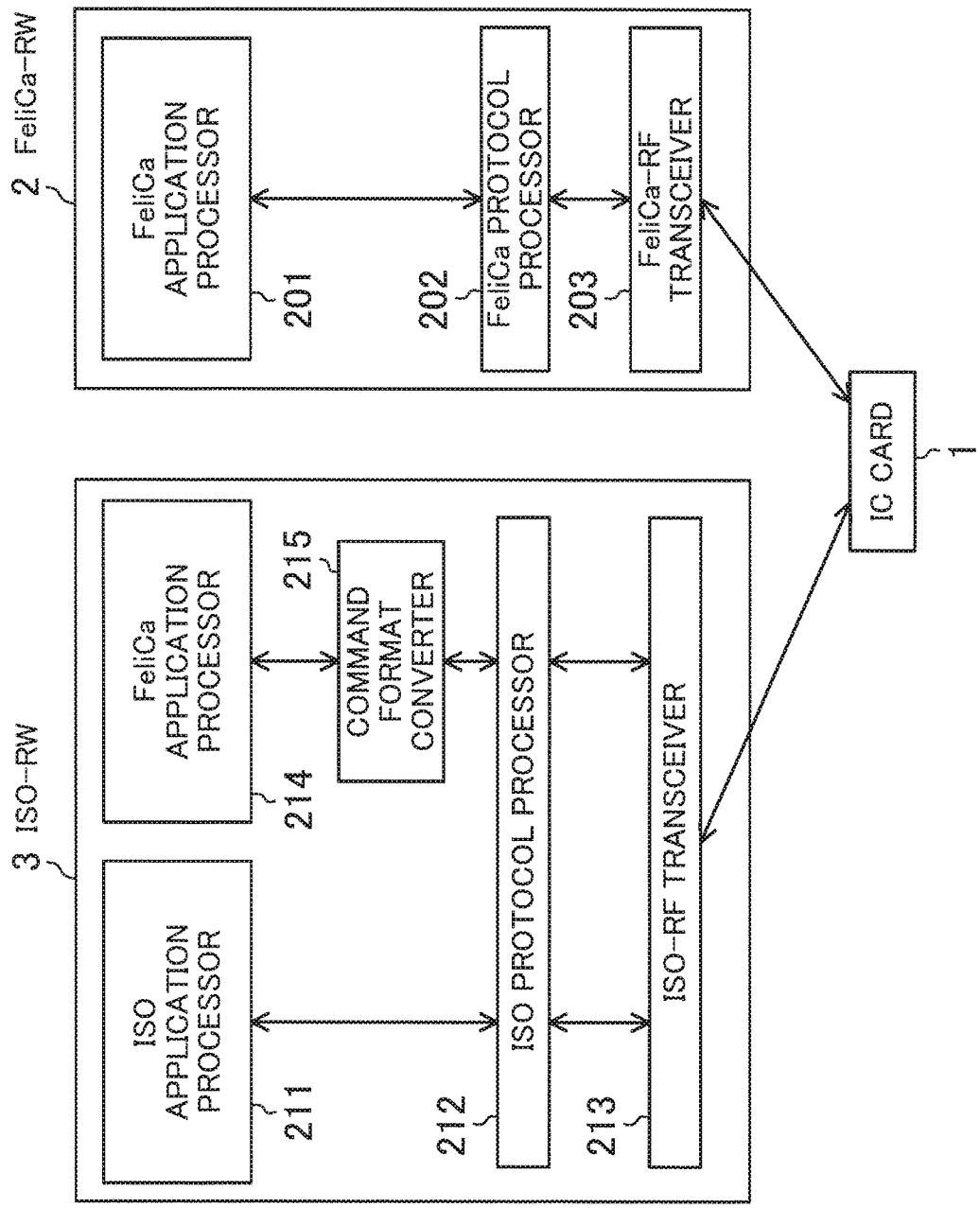
FIG. 12 is a block diagram illustrating the configurations of devices that form a communications system according to an exemplary embodiment.

FIG. 12 schematically illustrates the structures of the FeliCa-RW 2 and ISO-RW 3. It will be described briefly with reference to FIG. 12 and FIGS. 4-9 how the FeliCa-RW 2 and ISO-RW 3 perform their processing.

If the FeliCa-RW 2 is going to execute a FeliCa application in the IC card 1, the FeliCa application processor 201 constructs the command code 109 and command data 110 shown in FIG. 4 in accordance with each command to be sent, and passes them to the FeliCa protocol processor 202. In response, the FeliCa protocol processor 202 enters them into the C-cod 106 and C-Data 108, respectively, adds a LEN 105 and an IDm 107 to them, and then passes them to the FeliCa-RF transceiver 203. In response, the FeliCa-RF transceiver 203 enters them into the information field 103, adds a preamble 101, a sync code 102 and a CRC 104 thereto, and then transmits them to the IC card 1. The format of a response frame transmitted by the IC card 1 in response is as shown in FIG. 5. The response processing is performed in the same way as described above.

On the other hand, if the ISO-RW 3 is going to execute an ISO application in the IC card 1, the ISO application processor 211 constructs the CLA 148 through Le 153 shown in FIG. 6 in accordance with each command to be sent, and passes them to the ISO protocol processor 212. In response, the ISO protocol processor 212 enters them into the INF 146, adds a PCB 144, a CID 145 and a CRC 147 to them, and then passes them to the ISO-RF transceiver 213. In response, the ISO-RF transceiver 213 enters them into the frame body 142, adds an SOF 141 and an EOF 143 thereto, and then transmits them to the IC card 1. The format of a response frame transmitted by the IC card 1 in response is as shown in FIG. 7. The response processing is performed in the same way as described above.

If the ISO-RW 3 is going to execute a FeliCa application in the IC card 1, the FeliCa application processor 214 constructs the command code 181 and command data 182 shown in FIG. 8 in accordance with each command to be sent, and passes them to the command format converter 215. In response, the command format converter 215 enters them into the INS 149 and Cmd-Data 152, respectively, adds a CLA 148, a PAR 150, a Lc 151, and a Le 153 to them, and then passes them to the ISO protocol processor 212.

In this case, the most significant bit of the CLA is set to be "1" indicating that this is a unique command as described above. Also, the PAR 150 is not used, and therefore, set to be 00h (according to hexadecimal notation) corresponding to two bytes. Note that according to JISX 6319-4, a 2-byte command code is defined as a reserve for future expansion according to the FeliCa specification. If such an expanded command is used, the upper and lower bytes of the command code 181 may be mapped to the first byte of the INS 149 and the first byte of the PAR 150, respectively.

The ISO protocol processor 214 enters them into the INF 146, adds a PCB 144, a CID 145 and a CRC 147 to them, and then passes them to the ISO-RF transceiver 213. In response, the ISO-RF transceiver 213 enters them into the frame body 142, adds an SOF 141 and an EOF 143 to them, and then transmits them to the IC card 1. The format of a response frame transmitted by the IC card 1 in response is as shown in FIG. 9. The response processing is performed just as described above.

In the foregoing description, the ISO-RW 3 is supposed to be compatible with both FeliCa applications and ISO applications. If this communications device is compatible with only FeliCa applications, naturally the ISO application processor 211 may be omitted. Also, in the foregoing description of the ISO-RW 3, the processing to be performed by the FeliCa application processor 214 has been described separately from the processing to be performed by the command format converter 215 such that their processing is easily comparable to the processing to be performed by the IC card 1. However, there is no need to distinctly separate their processing, and the FeliCa application processor 215 may construct the CLA 148 through Le 153 shown in FIG. 8 during its application processing.

In this case, the IDm 107 shown in FIG. 4 and the CID 145 shown in FIG. 8 are both used to determine whether or not the given frame is addressed to itself and both play the same role. Thus, the format of the frame used when the ISO-RW 3 accesses the FeliCa application uses the CID, and does not use the IDm, as shown in FIGS. 8 and 9.

However, the IDm is a piece of information unique to the IC card 1, and therefore, may be used on a layer (e.g., command handling layer) at a higher level than the communication control. For example, if the IDm is used to genera cryptographic key data, then the key varies from one IC card to another. Thus, there will be a variety of keys for mutual authentication. To realize this, the ISO-RW 3 may be notified of the IDm of the IC card 1. Next, the IDm and CID will be described in further detail with reference to FIGS. 13 and 14.

Anticollision Processing Sequence

Figure 13:
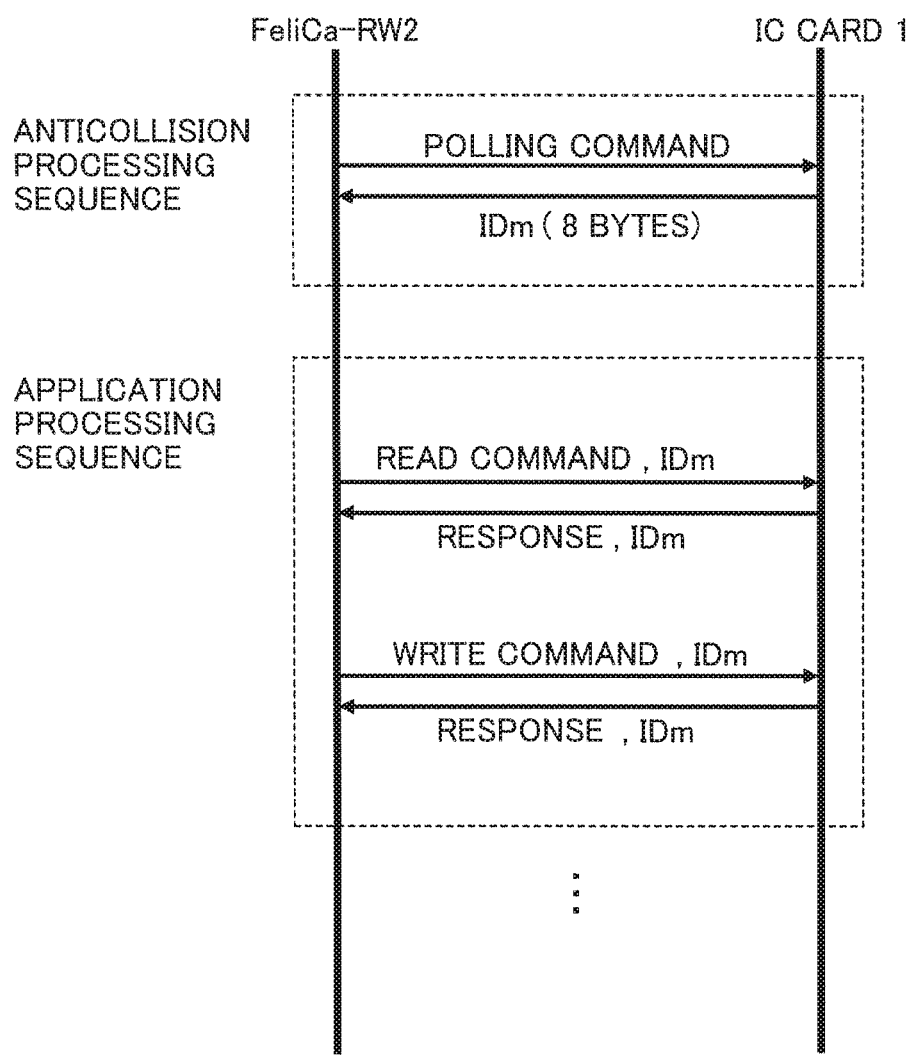
FIG. 13 shows the sequence of operations to be performed between a device and a communications device according to an exemplary embodiment.

FIG. 13 is a sequence diagram showing the role played by the IDm in the FeliCa communication protocol. Communication between the FeliCa-RW 2 and the IC card 1 is established by an anticollision processing sequence and an application processing sequence. As used herein, the "anticollision processing sequence" refers to the processing step of making the FeliCa-RW 2 recognize an IC card 1 present in the magnetic field generated, and includes the processing step of capturing only one of a plurality of IC cards, if present, in the magnetic field. On the other hand, the "application processing sequence" refers herein to the application processing (such as reading or writing data) to be performed on the IC card 1 that has been captured through the anticollision processing sequence.

According to the anticollision processing sequence, in response to a polling command transmitted by the FeliCa-RW 2, the IC card 1 returns an IDm of 8 bytes. The IDm has a unique value that varies from one IC card to another. If there are multiple IC cards in the magnetic field, each of those IC cards transmits a different IDm from the others. In the application processing sequence, transmission of each command and response with an IDm added thereto allows the IC card 1 to determine whether or not the command is addressed to itself, and also allows the FeliCa-R determine whether or not the response has come from its target IC card 1.

Figure 14:
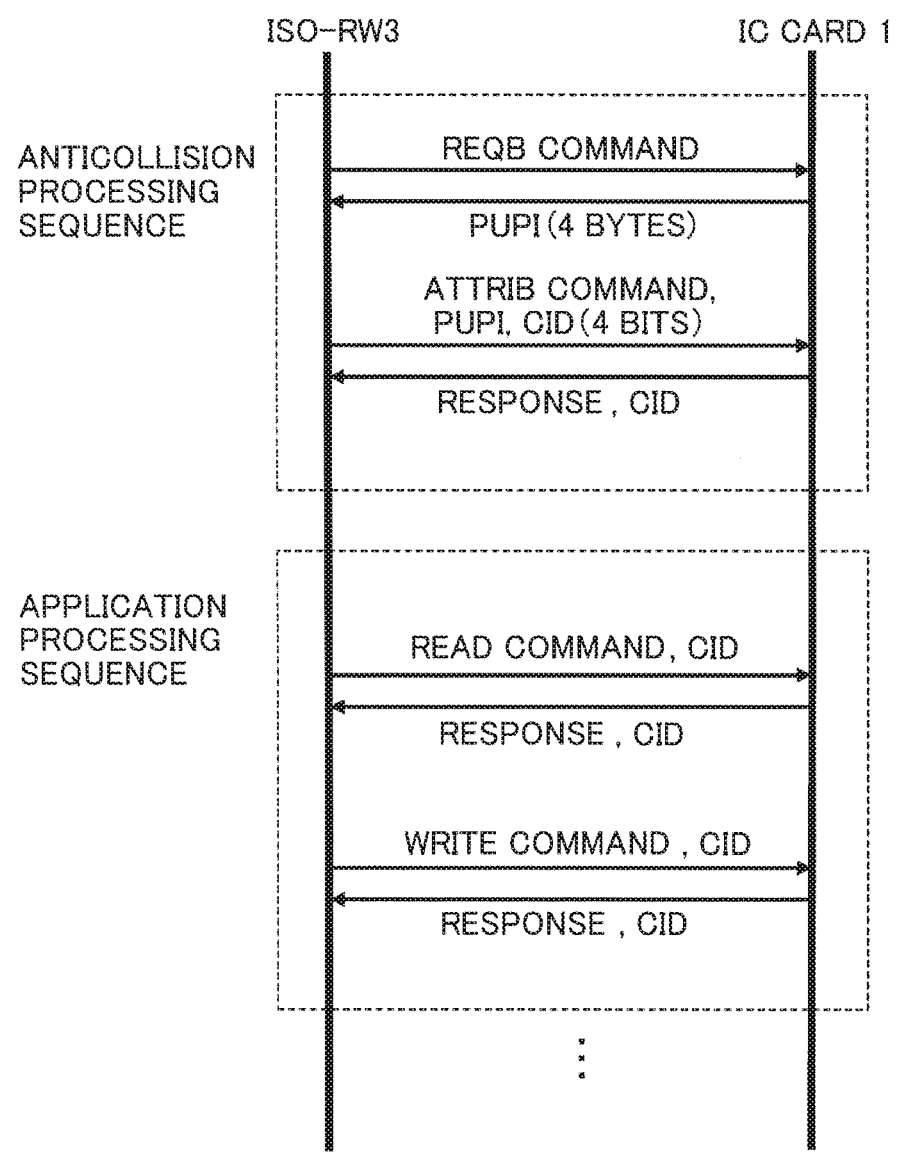
FIG. 14 shows the sequence of operations to be performed between another device and a communications device according to an exemplary embodiment.

FIG. 14 is a sequence diagram showing the role played by the CID in the ISO communication protocol. As in the FeliCa communication protocol, communication between the ISO-RW 3 and the IC card 1 is established through an anticollision processing sequence and an application processing sequence.

According to the anticollision processing sequence, responsive to a REQB command transmitted by the ISO-RW 3, the IC card 1 returns a pseudo-unique PICC identifier (PUPI) of 4 bytes. This PUPI corresponds to a UID of MIFARE and has a value unique to each IC card just like an IDm. However, the PUPI is a pseudo one and does not have a fixed value.

If there are multiple IC cards 1 present in the magnetic field, then those IC cards 1 transmit mutually different PUPIs. According to the FeliCa communication protocol, an IDm is added to the application processing sequence that follows, but it generates overhead to add an IDm of 8 bytes to each command and each response. The performance just needs to be high enough to process several IC cards, considering a situation where a plurality of IC cards are captured through the anticollision processing sequence and are handled at a time through the application processing sequence. In that case, to identify the plurality of IC cards, the code length may be no more than 4 bits. Thus, according to the ISO communication protocol, the ISO-RW 3 transmits a PUPI of 4 bytes and a CID of 4 hits as a pair to the IC card 1 in an ATTIB command following the REQB command, thereby replacing the PUPI with a CID. In the application processing sequence that follows, each command and each response are transmitted with a CID added thereto, thereby identifying the IC card 1 to communicate with. According to such an ISO communication protocol, there are several different methods of making the IC card 1 notify the ISO-RW 3 of an IDm. One of those methods is adding an IDm to a response to a REQB command.

Anticollision Processing

Figure 15:
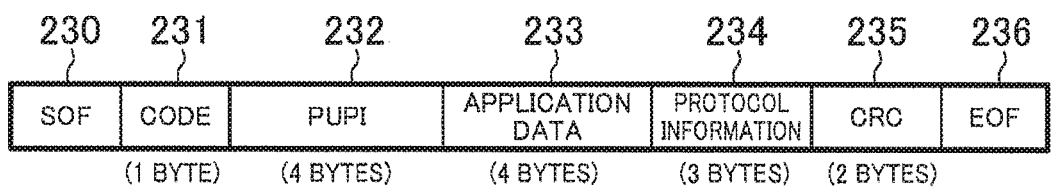
FIG. 15 shows the format of a frame to be used in an anticollision processing sequence according to an exemplary embodiment.

FIG. 15 illustrates the frame format of a response to a REQB command according to the ISO communication protocol. An SOF 230 and an EOF 236 are signals respectively indicating the start and end of a frame. A code 231 is a fixed value of 1 byte indicating that this frame is a response to a REQB command. A PUPI 232 is data with a length of 4 bytes as described above. Although 4 bytes are reserved for data unique to an application in application data 233, details are not specified by ISO but are left usable by applications. Furthermore, protocol information 234 of 3 bytes is used to control the communication protocol, and its usage is defined by ISO. A CRC 235 is an error detection code.

In this frame, it is the application data 233 that may be used to transmit an IDm. The PUPI 232 and the application data 233 have a length of 8 bytes, which is equal to the length of the IDm. Thus, the first 4 bytes of the IDm may be allocated to the PUPI 232 and the second 4 bytes thereof may be allocated to the application data 233. According to this method, there is no need to newly use a command to transmit the IDm, and the size of the data to be transmitted does not increase, either. This thus allows for minimizing the overhead.

However, if the PUPI is set to be a fixed value that varies from one IC card to another, then the PUPI can be associated with a particular cardholder, and therefore, allows a third party to track his or her activity, which would invade his or her privacy. However, if the PUPI is turned into a random number to avoid such a problem, the first four bytes of the IDm cannot be allocated to the PUPI, because the IDm is a fixed value that varies from one IC card to another according to the FeliCa protocol. That is why this method is impractical. According to another method, the IDm may be added to a response to an ATTRIB command that follows the REQB command.

Figure 16:
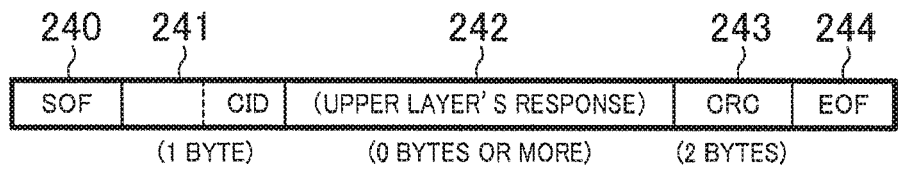
FIG. 16 shows the format of a frame to be used in an anticollision processing sequence according to an exemplary embodiment.

FIG. 16 illustrates the frame format of a response to an ATTRIB command according to the ISO communication protocol. An SOF 240 and an EOF 244 are signals respectively indicating the start and end of a frame. A CID is set in the lower four bits of one-byte data 241 that follows the SOP 240. A higher-level layer response 242 is optional data with a length of zero to several bytes. Its details are not defined by ISO but it is left usable by applications. A CRC 243 is an error detection code.

In this frame, it is the higher-level layer response 242 that may be used to transmit the IDm. Data of any arbitrary length may be allocated to the higher-level layer response 242, which makes it usable for IDm notification. However, since this is originally optional data, the size of the data to communicate increases by 8 bytes, which is negligible considering the overall application processing time. Just like the method described above, there is no need to newly use a command to transmit the IDm.

Alternatively, according to another method, the IDm may be stored in the FeliCa application file 65, for example, and then read responsive to an ordinary read command. Still alternatively, according to still another method, a dedicated command for reading the IDm may also be provided. These alternative methods, however, are somewhat disadvantageous in terms of the overhead of the processing time.

Compared to making the FeliCa-RW 2 execute a FeliCa application, making the ISO-RW 3 execute the FeliCa application increases the overhead, because the FeliCa application manager 62 needs to be selected. In a FeliCa application, the processing time is a key factor, particularly when the FeliCa technology is applied to IC transit cards, because the transit cards need to be processed as quickly as possible through a crowded automatic ticket gate.

To reduce the overhead during the selection processing, the FeliCa application manager 62 may be selected directly without accessing the in-card application manager 61. If no FeliCa applications were installed in the IC card, then an error response would be returned in response to this selection command. This thus allows the ISO-RW 3 to determine whether or not any FeliCa application is installed in the given IC card.

Such a method of finding what applications are contained in the given IC card by accessing the in-card application manager 61 may be used universally as a means for ensuring interoperability by starting from a state where a reader/writer and an IC card know nothing about each other. This method is also applicable suitably to a system designed to make a cardholder select an application to execute by him- or herself from a list of applications displayed on a terminal. However, if the usage is limited as in an automatic ticket gate, for example, it is also an effective measure to take to select a target application directly.

According to another optional method, a FeliCa application may be selected implicitly right after the anticollision processing sequence has been done. This allows for starting processing the FeliCa application immediately without taking the step of selecting an application before executing the FeliCa application. Besides, as already described with reference to FIG. 10, even when a FeliCa application is selected, an application selection command is still accepted preferentially. Thus, normal processing may be performed on every terminal device but an automatic ticket gate so as to select an application after having found what applications are contained in the given IC card 1.

This is a method to be used in only a FeliCa application such as an IC transit card. However, this method is preferably modified into a more universal one such that an application to be selected implicitly right after the anticollision processing sequence may be determined on a case-by-case basis. Such a modified method will be described below with reference to FIG. 17.

Figure 17:
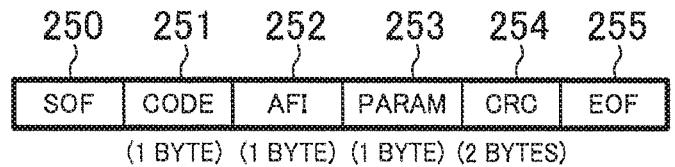
FIG. 17 shows the format of a frame to be used in an anticollision processing sequence according to an exemplary embodiment.

FIG. 17 illustrates the frame format of a REQB command. An SOF 250 and an EOF 255 are signals respectively indicating the start and end of a frame. A code 251 is a fixed value of 1 byte indicating that this frame is a REQB command. An AFI 252 is an application field identification (AFI) code as will be described later. A PARAM 253 is a parameter for use in anticollision processing. A CRC 254 is an error detection code.

The AFI 252 is a parameter used for limiting the number of IC cards responding to a REQB command such that if there are multiple IC cards present in the given magnetic field (e.g., when there are multiple IC cards in a single wallet), the probability of collision between their responses to the same REQB command is reduced.

Specifically, the AFI 252 defined by ISO is used in the following manner. The AFI 252 of 1 byte is divided into two. The upper 4 bits thereof are used to store a code indicating the field. The lower 4 bits thereof are used to store a code indicating the subfield. Each IC card 1 has its own field code and subfield code which were determined when the card was issued. If the AFI 252 of a REQB command has a value of 00h (hexadecimal notation), then every IC card responds to the REQB command. Alternatively, if the AFI 252 has a value of X0h, where 'X' is a value falling within the range of '1' to 'F,' only IC cards, of which the field code is 'X,' respond (supposing their own subfield code is neglected). Still alternatively, if the AFI 252 has a value of 0Yh, where 'Y' is a value falling within the range of '1' to 'F,' only IC cards, of which the subfield code is 'Y,' respond (supposing their own field code is neglected). Yet alternatively, if the AFI 252 has a value of XYh, only IC cards, of which the field code is 'X' and the subfield code is 'Y', respond. This allows for performing the anticollision processing efficiently by reducing the number of IC cards responding to the same REQB command.

In this case, if a predetermined field code and/or a predetermined subfield code is/are allocated to a FeliCa application, and if the value of the AFI 252 of a REQB command satisfies this condition, a response is returned, and the FeliCa application is selected implicitly. Likewise, if the AEI 252 of another REQB command has another predetermined value, then another predetermined application may be selected implicitly. In this case, two different field codes and/or subfield codes are allocated to the IC card 1. If the AFI 252 of another REQB command has a value of 00h or any other value, then no application is selected implicitly.

Alternatively, this parameter may also be applied in the following manner. For example, if the AFI 252 of another REQB command has a value of X1h, a response is returned to the REQB command, and a FeliCa application is selected implicitly. On the other hand, if the AFI 252 has a value of X2h, a response is returned to the REQB command, and another application is selected implicitly. However, if the AFI 252 has a value of X0h, a response is returned to the REQB command, hut no applications are selected implicitly. By determining separately, depending on the value(s) of the field code and/or the subfield code, whether or not to respond to a REQB command and whether or not to select an application implicitly, the parameter may be applied in various manners.

A method of transmitting an IDm as a response to either a REQB command or an ATTRIB command has been described with reference to FIG. 15 or 16. However, the IDm may be transmitted only when the AFI 252 of a REQB command agrees with a predetermined field code and/or a predetermined subfield code.

In the embodiment described above, the controller 5 returns a list of identification codes of the applications installed in the IC card 1 as a response to a selection command to select the in-card application manager 61. However, this is a non-limiting exemplary embodiment. Alternatively, a file to store the list of application identification codes may be stored in the memory 6, and the ISO-RW 3 may read the list of application identification codes from this file responsive to a different command (such as a read command).

IC Card's Hardware

Figure 18:
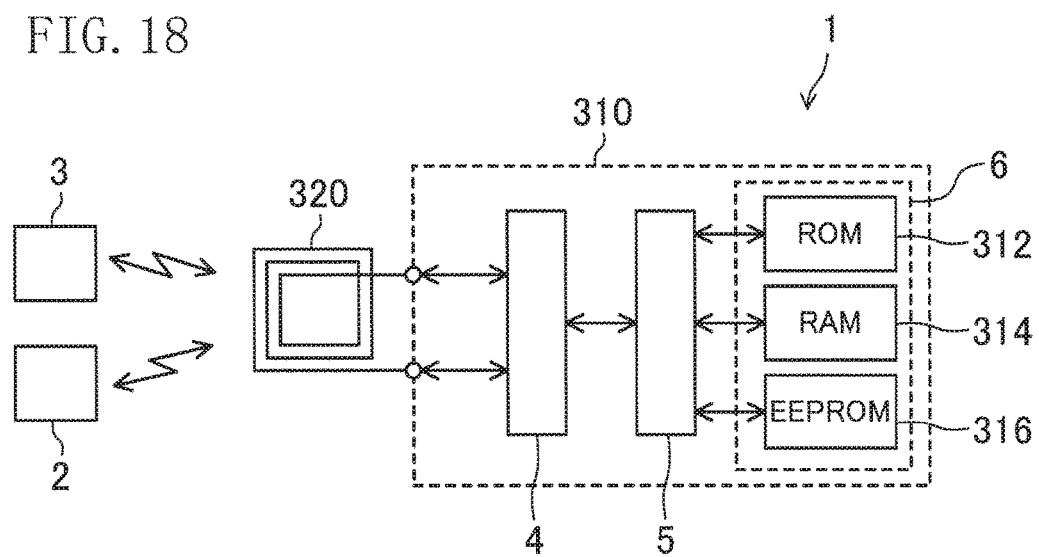
FIG. 18 is a block diagram illustrating an arrangement of hardware components of an IC card according to an exemplary embodiment.

FIG. 18 is a block diagram illustrating a hardware configuration for an IC card according to various embodiments. The IC card 1 includes an IC chip 310 and an antenna 320.

The antenna 320 is electrically connected to the IC chip 310. When the IC card 1 is located in close proximity to either the FeliCa-RW 2 or the ISO-RW 3, the antenna 320 is electromagnetically coupled to the FeliCa-RW 2 or the ISO-RW 3. The communications processor 4 generates a DC voltage based on the electromagnetic wave that the antenna 320 has received from the FeliCa-RW 2 or the ISO-RW 3, and supplies the DC voltage as a supply voltage to the IC chip 310.

The IC chip 310 includes the communications processor 4, the controller 5, and the memory 6. The memory 6 includes a ROM 312, a RAM 314, and an EEPROM 316. The ROM 312 stores application software or platform operating system (OS) which does not have to be altered. The RAM 314 stores data to function as a working memory mainly for the controller 5. The EEPROM 316, a nonvolatile memory, retains data even when the supply voltage supplied to the IC card 1 becomes lower than its operating voltage. Thus, the EEPROM 316 stores user data and other data to be used by application software.

As can be seen from the foregoing description, a communications device according to various embodiments described above is allowed to handle a command included in a frame that has been transmitted in compliance with the FeliCa protocol and a command included in a frame that has been transmitted in compliance with the ISO protocol. Since a piece of information playing the same role as device identification information to be used in the FeliCa protocol is defined separately by the ISO communication protocol, the device identification information does not have to be used in the ISO communication protocol. However, the device identification information is a piece of information unique to this communications device, and therefore, may be used in a higher layer than communication control (i.e., in a command handling layer) in order to vary the cryptographic key for mutual authentication (i.e., to provide different cryptographic key data for each communications device), for example. According to various embodiments, even when the ISO protocol is used, the device identification information may also be acquired from the communications device, and therefore, this piece of information may be used in command handling.

In addition, by adding an application identification code to a FeliCa application as well as in an application compliant with the ISO protocol, the FeliCa application may be selected in response to an application selection command as defined by the ISO standard. Furthermore, by providing a means for selecting a predetermined application implicitly if an application field identification code specified by the anticollision processing meets a predetermined condition, overhead for selecting the FeliCa application may be eliminated, and this communications device may be used as an IC transit card that needs to be processed as quickly as possible.

Also, there are some differences between the two communication protocols. For example, if any error has occurred while a command is being handled, a response indicating the error is returned to an external device in compliance with the ISO protocol, but no response is returned in compliance with the FeliCa protocol. Various embodiments described above, however, allow for overcoming these differences by changing the types of processing according to the communication protocol used, even if the result of processing is the same.

According to various embodiments described above, to provide coordination between multiple different applications as described above on the supposition that a system is to be established using an ordinary reader/writer that supports only one communication protocol, a FeliCa application file may be accessed using a frame and command system compliant with the ISO protocol.

In addition, the communications device according to various embodiments described above is provided with both an application compliant with the FeliCa protocol and an application compliant with the ISO protocol, and may select not only the application compliant with the ISO protocol but also the application compliant with the FeliCa protocol by using a command system for the ISO protocol. Furthermore, the communications device may select a FeliCa application in a short time so as to cope with a situation where this communications device is used at a crowded automatic ticket gate.

Various embodiments described above thus settle those differences between the FeliCa and ISO protocols.

As can be seen from the foregoing description, this improved IC card is usable in a far greater number of scenes, and therefore, is expected to newly create attractive applications as a result. For instance, although existent IC transit cards can be charged or have their balance displayed only with a ticket vending machine or automatic ticket gate inside a railway station, this improved IC transit card may be charged or have its balance displayed with various other machines. In addition, since the usage history of this IC transit card is readable for a different machine, it becomes easy to give advantages, including allowing special discount or providing priority seats, to those who have come to an event venue by public transportation, not by car. Furthermore, by making user support information (such as information about an aged or disabled person) recorded in the card readable for a ticket vending machine or automatic ticket gate, user friendly meticulous services, such as enlarging the on-screen font size, providing additional voice guidance, and extending the duration of gate opening, may also be provided.

A communications device according to an embodiment further includes an application selector. The memory stores a plurality of applications. The application selector selects one of the plurality of applications in accordance with an application selection command specifying one of application identification codes allocated to the respective applications. The second protocol processor handles the application selection command.

In a communications device according to an embodiment, if an application field identification code externally specified during anticollision processing satisfies a predetermined condition, a predefined application is selected.

In a communications device according to an embodiment, the command handler outputs, in accordance with information retained in the recognizer, a handling result of the command to either the first protocol processor or the second protocol processor.

In a communications device according to an embodiment, if the handling result indicates abnormality, the first transceiver does not transmit the handling result to any external device, and the second transceiver does transmit the handling result to an external device.

In a communications device according to an embodiment, the first communication protocol is defined by JISX 6319-4 and the second communication protocol is defined by ISO/IEC 14443.

Although various embodiments have been described, it is not intended that the present disclosure is limited to those exemplary illustrative embodiments, but those skilled in the art would readily make numerous modifications and variations to those embodiments without departing from the spirit of the present disclosure defined by the appended claims.

Embodiments of the present disclosure are applicable to a device or system that utilizes contactless communication technologies.

What is claimed is:

1. A communications device with an IC card function, comprising:
    a first transceiver configured to transmit and receive wirelessly a first signal compliant with a first communication protocol where first device identification information is used;
    a first protocol processor configured to process a first frame included in the first signal received by the first transceiver;
    a second transceiver configured to transmit and receive wirelessly a second signal compliant with a second communication protocol where second device identification information is used;
    a second protocol processor configured to process a second frame included in the second signal received by the second transceiver;
    a recognizer configured to recognize a communication protocol of a signal received by either the first transceiver or the second transceiver;
    a command handler configured to handle a first command extracted from the first frame;
    a converter configured to convert a second command extracted from the second frame and pass the converted second command to the command handler; and
    a memory configured to store the first device identification information, wherein
    the first transceiver transmits the first device identification information to a first external device,
    the second transceiver transmits the second device identification information to a second external device,
    the first device identification information is used to perform anticollision processing for allowing the first external device to identify the communications device to communicate with,
    the second device identification is used to perform anticollision processing for allowing the second external device to identify the communications device to communicate with, and
    the second transceiver transmits the first device identification information to the second external device, to be used for application processing.

2. The communications device of claim 1, further comprising an application selector, wherein
    the memory stores a plurality of applications,
    the application selector selects one of the plurality of applications in accordance with an application selection command specifying one of application identification codes allocated to the respective applications, and
    the second protocol processor handles the application selection command.

3. The communications device of claim 2, wherein
    if an application field identification code externally specified during anticollision processing satisfies a predetermined condition, a predefined application is selected.

4. The communications device of claim 1, wherein
    the command handler outputs, in accordance with information retained in the recognizer, a handling result of a command to either the first protocol processor or the second protocol processor.

5. The communications device of claim 4, wherein
if the handling result indicates abnormality, the first transceiver does not transmit the handling result to the first external device, and the second transceiver does transmit the handling result to the second external device.

6. The communications device of claim 1, wherein
the first communication protocol is defined by JISX 6319-4 and the second communication protocol is defined by ISO/IEC 14443.

7. A communications system comprising a communications device with an IC card function, a first device, and a second device, wherein
the first device transmits and receives wirelessly a first signal compliant with a first communication protocol to/from the communications device,
the second device transmits and receives wirelessly a second signal compliant with a second communication protocol to/from the communications device,
the communications device includes:
a first transceiver configured to transmit and receive the first signal compliant with the first communication protocol where first device identification information is used;
a first protocol processor configured to process a first frame represented by the first signal received by the first transceiver;
a second transceiver configured to transmit and receive the second signal compliant with the second communication protocol where second device identification information is used;
a second protocol processor configured to process a second frame included in the second signal received by the second transceiver;
a recognizer configured to recognize a communication protocol of a signal received by either the first transceiver or the second transceiver;
a command handler configured to handle a first command extracted from the first frame;
a converter configured to convert a second command extracted from the second frame and pass the converted second command to the command handler; and
a memory configured to store the first device identification information, wherein the first transceiver transmits the first device identification information to the first device,
the second transceiver transmits the second device identification information to the second device,
the first device identification information is used to perform anticollision processing for allowing the first device to identify the communications device to communicate with,
the second device identification information is used to perform anticollision processing for allowing the second device to identify the communications device to communicate with, and
the second transceiver transmits the first device identification information to the second device, to be used for application processing.

8. The communications system of claim 7, further comprising an application selector, wherein
the memory stores a plurality of applications,
the application selector selects one of the plurality of applications in accordance with an application selection command specifying one of application identification codes allocated to the respective applications, and
the second device transmits the application selection command to the communications device.

9. The communications system of claim 8, wherein
if an application field identification code specified by the second device during anticollision processing satisfies a predetermined condition, a predefined application is selected by the communications device.

10. The communications system of claim 7, wherein
the command handler outputs, in accordance with information retained in the recognizer, a handling result of a command to either the first protocol processor or the second protocol processor.

11. The communications system of claim 10, wherein
if the handling result indicates abnormality, the first transceiver does not transmit the handling result to the first device, and the second transceiver does transmit the handling result to the second device.

12. The communications system of claim 7, wherein
the first communication protocol is defined by JISX 6319-4 and the second communication protocol is defined by ISO/IEC 14443.

* * * * *